US012277166B2

(12) United States Patent
Nie et al.

(10) Patent No.: US 12,277,166 B2
(45) Date of Patent: Apr. 15, 2025

(54) METHOD AND SYSTEM FOR RAPID RETRIEVAL OF TARGET IMAGES BASED ON ARTIFICIAL INTELLIGENCE

(71) Applicant: SHANDONG JIANZHU UNIVERSITY, Shandong (CN)

(72) Inventors: Xiushan Nie, Jinan (CN); Yang Shi, Jinan (CN); Xinfeng Liu, Jinan (CN); Xingbo Liu, Jinan (CN); Xiaoming Xi, Jinan (CN); Yilong Yin, Jinan (CN)

(73) Assignee: SHANDONG JIANZHU UNIVERSITY, Jinan (CN)

( * ) Notice: Subject to any disclaimer, the term of this patent is extended or adjusted under 35 U.S.C. 154(b) by 396 days.

(21) Appl. No.: 17/968,666

(22) Filed: Oct. 18, 2022

(65) Prior Publication Data
US 2023/0134531 A1  May 4, 2023

(30) Foreign Application Priority Data
Oct. 28, 2021 (CN) .......................... 202111259001.4

(51) Int. Cl.
*G06F 16/532* (2019.01)
*G06V 10/74* (2022.01)
*G06V 10/774* (2022.01)
*G06V 10/776* (2022.01)
*G06V 10/82* (2022.01)

(52) U.S. Cl.
CPC .......... *G06F 16/532* (2019.01); *G06V 10/761* (2022.01); *G06V 10/774* (2022.01); *G06V 10/776* (2022.01); *G06V 10/82* (2022.01)

(58) Field of Classification Search
CPC ... G06V 10/764; G06V 10/774; G06T 7/0012
See application file for complete search history.

(56) References Cited

U.S. PATENT DOCUMENTS

| | | | | |
|---|---|---|---|---|
| 7,035,464 | B2* | 4/2006 | Masuda | G06F 16/5838 382/190 |
| 7,215,828 | B2* | 5/2007 | Luo | G06V 10/242 382/296 |
| 7,668,388 | B2* | 2/2010 | Bryll | G06T 7/0004 382/255 |
| 7,991,232 | B2* | 8/2011 | Iwamoto | G06V 10/50 382/118 |
| 8,026,951 | B2* | 9/2011 | Kondo | G06T 7/77 348/222.1 |
| 8,774,515 | B2* | 7/2014 | Mensink | G06F 18/2431 382/128 |
| 10,169,684 | B1* | 1/2019 | Nathan | G06F 16/7837 |

* cited by examiner

*Primary Examiner* — Yosef Kassa
(74) *Attorney, Agent, or Firm* — Oliff PLC

(57) ABSTRACT

A method and system for rapid retrieval of target images based on artificial intelligence, obtaining a template image and a plurality of known labels corresponding to the template image; extracting an image to be detected from a target image database; inputting both the image to be detected and the template image into a trained convolutional neural network, and outputting a hash code of the image to be detected and a hash code of the template image; obtaining a similarity between the images based on a Hamming distance between the hash codes, then selecting one or more images to be detected with the similarity higher than a set threshold as a retrieval result to output. Accordingly, the method and system is able to better cope with the retrieval of items in complex scenarios.

9 Claims, 1 Drawing Sheet

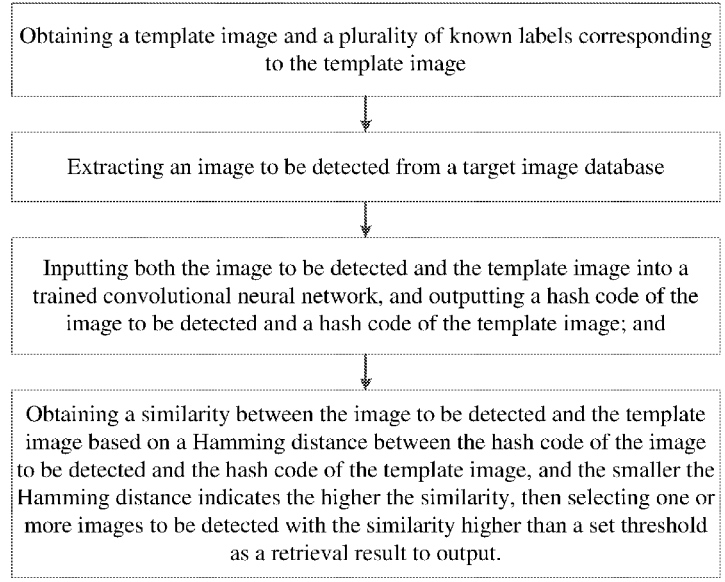

Obtaining a template image and a plurality of known labels corresponding to the template image

Extracting an image to be detected from a target image database

Inputting both the image to be detected and the template image into a trained convolutional neural network, and outputting a hash code of the image to be detected and a hash code of the template image; and

Obtaining a similarity between the image to be detected and the template image based on a Hamming distance between the hash code of the image to be detected and the hash code of the template image, and the smaller the Hamming distance indicates the higher the similarity, then selecting one or more images to be detected with the similarity higher than a set threshold as a retrieval result to output.

METHOD AND SYSTEM FOR RAPID RETRIEVAL OF TARGET IMAGES BASED ON ARTIFICIAL INTELLIGENCE

CROSS-REFERENCES TO RELATED APPLICATIONS

This application claims priority benefits to Chinese Patent Application No. 202111259001.4, filed 28 Oct. 2021, the contents of which are incorporated herein by reference.

TECHNICAL FIELD

The present invention relates to the technology field of image retrieval, and in particular to a method and system for rapid retrieval of target images based on artificial intelligence.

BACKGROUND

Information of the related art part is merely disclosed to increase the understanding of the overall background of the present invention, but is not necessarily regarded as acknowledging or suggesting, in any form, that the information constitutes the prior art known to a person of ordinary skill in the art.

The article retrieval aims to process, analyze and understand the images captured by cameras using computers or robots to identify targets and objects in a variety of different patterns, and it is an important research topic in the field of computer vision.

Nowadays, the robots can be used to collect images of real environments, and for simple images, it is easy to learn a suitable feature representation therefor to distinguish them from samples with different semantics. However, in complex scenarios, the images require more attention to get an appropriate feature representation. The complex scenarios, for example, in a multi-label learning (the image contains multiple labels), the similarity among images is not transferable, i.e., there exists an image A that is similar to an image B (the image A and the image B have one or more identical labels), and the image A that is similar to an image C, but the image B is not similar to the image C (the image B and the image C do not have identical labels). Therefore, the popular article retrieval methods treat all samples equally, which leads to relatively poor generalization performance of the article retrieval methods in complex scenarios.

(1) The article retrieval in complex scenarios contains a large number of confusing entities, which generally have similar feature representations and the popular article retrieval methods cannot distinguish the entities (do not consider the characteristic of easy-confusion).

(2) The article retrieval in complex scenarios requires more accurate image similarity in order to mine the true similarity relationships of images to guide the generation of image features, and the existing article retrieval methods do not consider mining the similarity relationships of images.

(3) The article retrieval in complex scenarios needs to provide more attention to complex samples and divide attention reasonably, but the existing article retrieval methods treat all samples equally.

SUMMARY

To overcome the shortcomings in the prior art, the present invention provides a method and system for rapid retrieval of target images based on artificial intelligence.

A first aspect, the present invention provides a method for rapid retrieval of target images based on artificial intelligence.

The method for rapid retrieval of target images based on artificial intelligence, comprising:

obtaining a template image and a plurality of known labels corresponding to the template image;

extracting an image to be detected from a target image database;

inputting both the image to be detected and the template image into a trained convolutional neural network, and outputting a hash code of the image to be detected and a hash code of the template image; and obtaining a similarity between the image to be detected and the template image based on a Hamming distance between the hash code of the image to be detected and the hash code of the template image, and the smaller of the Hamming distance indicates the higher of the similarity, then selecting one or more images to be detected with the similarity higher than a set threshold as a retrieval result to output.

A second aspect, the present invention provides a system for rapid retrieval of target images based on artificial intelligence.

The system for rapid retrieval of target images based on artificial intelligence, comprising:

an acquisition module, configured to: obtaining a template image and a plurality of known labels corresponding to the template image;

an extraction module, configured to: extracting an image to be detected from a target image database;

a conversion module, configured to: inputting both the image to be detected and the template image into a trained convolutional neural network, then outputting a hash code of the image to be detected and a hash code of the template image; and an output module, configured to: obtaining a similarity between the image to be detected and the template image based on a Hamming distance between the hash code of the image to be detected and the hash code of the template image, and the smaller of the Hamming distance indicates the higher of the similarity, and then selecting one or more images to be detected with the similarity higher than a set threshold as a retrieval result to output.

Compared with the prior art, the beneficial effect of the present invention is:

According to the present invention, through the use of artificial intelligence technology to realize the extraction of the image features of the image samples in complex scenarios collected by the robot vision platform based on a convolutional neural network and using the hash method to extract image features, introducing the distinguish of the confusable entities, optimizing the similarity relationship and distinguishing the sample attention, to better cope with the retrieval of items in complex scenarios.

Advantages of additional aspects of the present invention will be set forth in part in the description that follows, or will be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

FIG. 1 is a flow chart of a method of Example 1.

DETAILED DESCRIPTION

It should be pointed out that the following detailed descriptions are all illustrative and are intended to provide further descriptions of the present invention. Unless otherwise specified, all technologies and scientific terms used in the present invention have the same meanings as those usually understood by a person of ordinary skill in the art to which the present invention belongs.

All data obtained in the present example are legally applied to the data on the basis of the laws and regulations and the consent of the user.

Example 1

The present example provides a method for rapid retrieval of target images based on artificial intelligence.

As shown in FIG. 1, the method for rapid retrieval of target images based on artificial intelligence, comprising:

S101: obtaining a template image and a plurality of known labels corresponding to the template image;

S102: extracting an image to be detected from a target image database;

S103: inputting both the image to be detected and the template image into a trained convolutional neural network, and outputting a hash code of the image to be detected and a hash code of the template image; and S104: obtaining a similarity between the image to be detected and the template image based on a Hamming distance between the hash code of the image to be detected and the hash code of the template image, and the smaller of the Hamming distance indicates the higher of the similarity, then selecting one or more images to be detected with the similarity higher than a set threshold (e.g. 90%) as a retrieval result to output.

Exemplarily, the template image is a known image, and the known labels corresponding to the template image, comprising, for example, mountain, water, tree, flower, animal, pedestrian, road, vehicle, etc.

Exemplarily, the S102: extracting an image to be detected from a target image database; wherein an extraction rule is an extraction without replacement.

Further, the convolutional neural network is an improved convolutional neural network CNN-F (CNN-F, Convolutional Neural Networks and the Improved Fisher Vector Network).

Wherein, the improved convolutional neural network CNN-F, a network structure thereof comprises:

sequentially connected a first convolutional layer, a second convolutional layer, a third convolutional layer, a fourth convolutional layer, a fifth convolutional layer, a first fully connected layer, a second fully connected layer, a third fully connected layer and a Tanh function layer.

An output dimension of the third fully connected layer is set to K dimensions.

Further, the trained convolutional neural network, a training step thereof comprises:

constructing a training set and a test set; the training set and the test set, both comprising: images with known labels;

inputting the images with known labels of the training set, into the convolutional neural network for training, and then outputting hash codes of the images with known labels by the convolutional neural network; constructing a loss function based on the hash codes of the images with known labels and the known labels; stopping the training when the loss function reaches a minimum value; and inputting the test set into the convolutional neural network for testing, stopping the testing when an accuracy exceeds the set threshold, and identifying the current convolutional neural network as the trained convolutional neural network.

Further, the trained convolutional neural network, is obtained by using different loss functions for training based on different situations.

Further, the obtaining of the trained convolutional neural network by using different loss functions for training based on different situations, specifically comprising:

when it is required to make that prediction scores of all negative samples as low as possible and prediction scores of all positive samples as high as possible, and a range of values of the similarity scores is $[-1,1]$, then using a unified loss function $L_u$ based on the similarity of hash codes;

when the loss function $L_u$ is required to focus on positive samples with low similarity prediction scores, then using a loss function $L_{su}$ that weights an interval of the similarity prediction scores of positive and negative samples;

when it is required to make the prediction scores of all negative samples as low as possible and the prediction scores of all positive samples as high as possible, and the range of values of the used similarity scores is $[0,1]$, then using a loss function $L_c$ based on the similarity of hash codes;

when the loss function $L_c$ is required to focus on positive samples with low similarity prediction scores, then using a loss function $L_{sc}$ that weights the interval of the similarity prediction scores of the positive and negative samples;

when the loss function $L_{sc}$ is required to expect a significant difference between the similarity prediction scores of the negative samples and the similarity prediction scores of the positive samples, then using a loss function $L_h$;

when the loss function $L_{su}$ is required to update a similarity matrix in a process of optimization, then using a unified loss function $L_{sus}$, weighted based on an interval of the optimized similarity matrix;

when the loss function $L_{sc}$ is required to update the similarity matrix in the process of optimization, then using a circular loss function $L_{scs}$ weighted based on the interval of the optimized similarity matrix;

when the loss function $L_h$ is required to update the similarity matrix in the process of optimization, then using a loss function $L_{hs}$.

Further, the unified loss function $L_u$ based on the similarity of the hash codes, a formula thereof is expressed as:

$$L_u = \frac{1}{n}\sum_{1}^{n}\log\left[1 + \frac{1}{|X_i^+||X_i^-|}\sum_{x_k \in X_i^-}\exp(\gamma(\varphi_{ik}+m))\sum_{x_j \in X_i^+}\exp(\gamma(-\varphi_{ij}))\right] \quad (1)$$

wherein, $|g|$ denotes the number of samples in the set, $X_i^+$ denotes the set of similar samples of the samples $x_i$, $X_i^-$ denotes the set of dissimilar samples of the samples $x_i$, γ is a scaling factor, m is an interval, n is the number of images in the training set, $\varphi_{ik}$ is the prediction sample similarity of the hash codes of the samples $x_i$ and $x_k$, $\varphi_{ij}$ is the prediction sample similarity of the hash codes of the samples $x_i$ and $x_j$, wherein, $x_j$ is the j-th sample, $x_k$ is the k-th sample.

It should be understood that, first sending the image to be detected I obtained by using the robot vision platform into the convolutional neural network (CNN) to obtain the features $F \in R^{C \times H \times W}$ of the image, wherein C, H and W are respectively the number of channels, a height and a width of the image feature F.

The present invention adopts a deep supervised hash learning method and the loss function uses a Circle Loss triplet loss. The Circle Loss provides a simple and intuitive idea for the article retrieval in complex scenarios in the form of three tuple. The triplet loss comprises a prediction score $S_p^i$ of an anchor point x and its positive samples $x_i$ (existence of the same class), and a prediction score $S_n^j$ of the anchor point x and its negative samples $x_j$ (non-existence of the same class).

In the retrieval task, whether two images are similar or not is based on whether they contain objects of the same class; therefore, when a image pair contains multi-entity complex scene images, there is a difference between the actual similarity of the image pair and the similarity at retrieval. Specifically, for the anchor point, the different positive samples may have different numbers of similar objects with anchor point (the number of intersections of category labels), which means that there is a difference in the actual similarity between the positive sample and the anchor point (obviously the more of the number of intersections of category labels, the higher of the actual similarity should be). Although the image pair has only two types of labels, similar and dissimilar, during retrieval, the similarity of the image pair is also considered as these two types of labels (similar or dissimilar) during training will cause certain problems, therefore the similarity between the image pair should be distinguished.

The present invention adds a new Tanh function layer to the last layer of the existing CNN-F network, and the Tanh function layer is used as an activation function layer to limit the range of values of each dimension of the network output to the interval of [−1,1]. The input image I is processed by a CNN-F network to obtain the image feature F, and then is processed by a Tanh activation layer to obtain an output $h_I$, so that the hash code $b_I = \text{sign}(h_I)$ can be obtained, wherein sign(g) is a symbolic function.

In order to facilitate the optimal solution of the objective function, the present method uses $h_I$ directly in the objective function instead of $b_I$. Thus the prediction sample similarity score of the hash code of the sample $x_i$ and $x_j$ is defined as:

$$\varphi_{ij} = \frac{1}{c} h_i^T h_j$$

wherein, C denotes a length of the hash code, the range of h is [−1,1], so the similarity score of the sample at this time takes the range of value [−1,1].

Further, the loss function $L_{su}$ that weights the interval of the similarity prediction scores of positive and negative samples is expressed as:

$$L_{su} = \quad (2)$$

$$\frac{1}{n}\sum_{1}^{n} \log\left[1 + \frac{1}{|X_i^+||X_i^-|} \sum_{x_k \in X_i^-} \exp(\gamma(\varphi_{ik})) \sum_{x_j \in X_i^+} \exp(\gamma(-\varphi_{ij} + s_{ij} \cdot m))\right]$$

wherein, $s_{ij}$ is the similarity of the sample $x_i$ and $x_j$.

It should be understood that obviously minimizing Eq. (1) would make the prediction scores of all negative samples as low as possible and the prediction scores of all positive samples as high as possible.

However, Eq. (1) does not consider the similarity between the positive sample and the anchor, i.e., it should allow the similarity between the positive sample and the anchor to be used to weight the interval between the similarity prediction scores of the positive and negative samples.

Obviously, the loss function (Eq. (2)) will focus on the positive samples with low similarity prediction score, and such positive samples are generally complex scene images, thus improving the retrieval ability of complex scene images. In addition, the greater of the similarity between the positive sample and the anchor point, the greater of the interval of corresponding set in the equation, so that for positive samples with the same similarity prediction score, the loss function will give greater weight (i.e., attention) based on positive samples with higher similarity, thus further optimizing the distribution of hash codes.

Further, the loss function $L_c$ is expressed as:

$$L_c = \frac{1}{n}\sum_{1}^{n} \log \quad (3)$$

$$\left[1 + \frac{1}{|X_i^+||X_i^-|} \sum_{x_k \in X_i^-} \exp\left(\gamma(\varphi_{ik} + 1)^2\right) \sum_{x_j \in X_i^+} \exp\left(\gamma(\varphi_{ij} - 1)^2 - m\right)\right]$$

wherein, $L_c$ is a circular loss function based on the similarity of the hash codes.

If the range of values of the used similarity prediction score is [0, 1], the loss function is as shown in Eq. (3).

At this time, the similarity prediction score of negative samples is centered at −1; at this time, a new loss function (4) can be obtained if introducing the interval weighting.

Further, the loss function $L_{sc}$ is expressed as:

$$L_{sc} = \frac{1}{n}\sum_{1}^{n} \log\left[1 + \frac{1}{|X_i^+||X_i^-|} \sum_{x_k \in X_i^-} \exp\left(\gamma(\varphi_{ik} + 1)^2\right) \right. \quad (4)$$

$$\left. \sum_{x_j \in X_i^+} \exp\left(\gamma(\varphi_{ij} - 1)^2 - (s_{ij} - 1) \cdot m\right)\right]$$

wherein, $L_{sc}$ denotes the round loss function that weights the interval of the similarity prediction scores of positive and negative samples.

The three variables in the three tuple are referred to as the anchor point, the positive sample and the negative sample. The positive sample is similar to the anchor point and the negative sample is not similar to the anchor point. The greater of the similarity between the positive sample and the anchor point, the smaller of the radius of the circle loss function, i.e., requiring the closer of the distance between the similarity predicted scores of positive and negative samples and −1 or 1; on the contrary, the smaller the constraint on distance.

Further, the loss function $L_h$ is expressed as:

$$L_h = \frac{1}{n}\sum_{1}^{n} \log\left[1 + \frac{1}{|X_i^+||X_i^-|} \sum_{x_k \in X_i^-} \exp\left(\gamma(\max(0, \varphi_{ik} + t))^2\right) \sum_{x_j \in X_i^+} \exp\left(\gamma(\max(0, \varphi_{ij} - s_{ij}^{\alpha}))^2 - m\right)\right] \quad (5)$$

wherein, $L_h$ denotes the circular loss function that combines the characteristics of the hash retrieval task, t is a hyper-parameter that regulates the highest similarity score for negative samples, and α is a hyper-parameter that regulates the lowest similarity score for positive samples. According to Eq. (5), it can be seen that only the negative samples with prediction scores higher than −t are concerned, and the higher the score, the higher the degree of concern, which makes the above equation only sets the threshold of −t for the prediction scores of negative samples, without forcing the prediction scores of all negative samples to converge to −1. In addition, the above equation concerns positive samples with prediction scores lower than $s_{ij}^{\alpha}$, and the lower the score, the higher the degree of concern, which also makes the above equation only set a threshold for the prediction scores of positive samples according to their actual similarity, without forcing the prediction scores of all positive samples to converge to 1. Accordingly, compared with $L_c$ and $L_{sc}$, the present loss function more concerns the positive samples whose similarity prediction scores are too far away from the actual similarity, to obtain a more segregated hash code distribution. At this time, the similarity relationship to be optimized then can be considered, i.e., the similarity matrix is updated in the process of optimization to obtain a more realistic similarity relationship. In the above-mentioned loss functions, the loss functions that use the similarity matrix are $L_{su}$, $L_{sc}$ and $L_h$, and then three new loss functions $L_{sus}$, $L_{scs}$ and $L_{hs}$ can be obtained by introducing iterative optimization of the similarity matrix (optimizing the similarity matrix during training) in these three loss functions.

Further, the unified loss function $L_{sus}$ weighted based on the interval of the optimized similarity matrix is expressed as:

$$L_{sus} = \frac{1}{n}\sum_{1}^{n} \log\left[1 + \frac{1}{|X_i^+||X_i^-|} \sum_{x_k \in X_i^-} \exp(\gamma(\varphi_{ik})) \sum_{x_j \in X_i^+} \exp\left(\gamma(-\varphi_{ij} + s_{ij}' \cdot m)\right)\right] \quad (6)$$

Further, the circular loss function $L_{scs}$ weighted based on the interval of the optimized similarity matrix is expressed as:

$$L_{scs} = \frac{1}{n}\sum_{1}^{n} \log\left[1 + \frac{1}{|X_i^+||X_i^-|} \sum_{x_k \in X_i^-} \exp\left(\gamma(\varphi_{ik} + 1)^2\right) \sum_{x_j \in X_i^+} \exp\left(\gamma(\varphi_{ij} - 1)^2 - (s_{ij}' - 1) \cdot m\right)\right] \quad (7)$$

Further, the circular loss function $L_{hs}$ based on the similarity matrix combined with the characteristics of the hash retrieval task is expressed as:

$$L_{ns} = \frac{1}{n}\sum_{1}^{n} \log\left[1 + \frac{1}{|X_i^+||X_i^-|} \sum_{x_k \in X_i^-} \exp\left(\gamma(\max(0, \varphi_{ik} + t))^2\right) \sum_{x_j \in X_i^+} \exp\left(\gamma(\max(0, \varphi_{ij} - s_{ij}^{\alpha'}))^2 - m\right)\right] \quad (8)$$

The data of the present invention comes from the pictures of objects collected by the robot vision platform in real environments, such as some digital devices, underwater fish, land wild animals, landmark buildings and various other pictures. And the pre-processing includes the previously mentioned weakly supervised background removal, random erasure, normalization, random rotation, etc.

According to the present invention, the image retrieval problem in complex scenarios can be better coped with, the image features are generated by using hashing methods, the easily confused entities are distinguished in the loss functions, and more accurate image similarity relationships can be obtained, while providing more attention to complex samples. At the same time, the structure of the model is intuitive and easy to migrate and deploy for implementation. The evaluation metric uses mAP (mean Average Precision), thus it can be seen that the accuracy of the present invention is more accurate than any other methods, especially on two multi-label datasets, NUS-WIDE and MS-COCO, with significantly superior performance.

Example 2

The present example provides a system for rapid retrieval of target images based on artificial intelligence.

The system for rapid retrieval of target images based on artificial intelligence, comprising:
an acquisition module, configured to: obtaining a template image and a plurality of known labels corresponding to the template image;
an extraction module, configured to: extracting an image to be detected from a target image database;
a conversion module, configured to: inputting both the image to be detected and the template image into a trained convolutional neural network, then outputting a hash code of the image to be detected and a hash code of the template image; and
an output module, configured to: obtaining a similarity between the image to be detected and the template image based on a Hamming distance between the hash code of the image to be detected and the hash code of the template image, and the smaller of the Hamming distance indicates the higher of the similarity, and then selecting one or more images to be detected with the similarity higher than a set threshold as a retrieval result to output.

It should be noted here that the acquisition module, the extraction module, the conversion module and the output module mentioned above correspond to steps from S101 to S104 in Example 1, and the above-mentioned modules are implemented with the same examples and application scenarios as the corresponding steps, but are not limited to the contents disclosed in Example 1. It is to be noted that the above-mentioned modules can be executed as part of a system in a computer system such as a set of computer executable instructions.

The foregoing descriptions are merely preferred embodiments of the present invention, but not intended to limit the present invention. A person skilled in the art may make various alterations and variations to the present invention. Any modification, equivalent replacement, or improvement made within the spirit and principle of the present invention shall fall within the protection scope of the present invention.

What is claimed is:

1. A method for rapid retrieval of target images based on artificial intelligence, comprising:
   obtaining a template image and a plurality of known labels corresponding to the template image;
   extracting an image to be detected from a target image database;
   inputting both the image to be detected and the template image into a trained convolutional neural network, and outputting a hash code of the image to be detected and a hash code of the template image; and
   obtaining a similarity between the image to be detected and the template image based on a Hamming distance between the hash code of the image to be detected and the hash code of the template image, and the smaller of the Hamming distance indicates the higher of the similarity, then selecting one or more images to be detected with the similarity higher than a set threshold as a retrieval result to output;
   based on different situations, different loss functions are used for training, comprising:
   when it is required to make prediction scores of all negative samples as low as possible and prediction scores of all positive samples as high as possible, and a range of values of the similarity scores is [−1, 1], then using a unified loss function $L_u$ based on the similarity of hash codes;
   when the loss function $L_u$ is required to focus on positive samples with low similarity prediction scores, then using a loss function $L_{su}$ that weights an interval of the similarity prediction scores of positive and negative samples;
   when it is required to make the prediction scores of all negative samples as low as possible and the prediction scores of all positive samples as high as possible, and the range of values of the used similarity scores is [0, 1], then using a loss function $L_c$ based on the similarity of hash codes;
   when the loss function $L_c$ is required to focus on positive samples with low similarity prediction scores, then using a loss function $L_{sc}$ that weights the interval of the similarity prediction scores of the positive and negative samples;
   when the loss function $L_{sc}$ is required to expect a significant difference between the similarity prediction scores of the negative samples and the similarity prediction scores of the positive samples, then using a loss function $L_h$;
   when the loss function $L_{su}$ is required to update a similarity matrix in a process of optimization, then using a unified loss function $L_{sus}$, weighted based on an interval of the optimized similarity matrix;
   when the loss function $L_{sc}$ is required to update the similarity matrix in the process of optimization, then using a circular loss function $L_{scs}$ weighted based on the interval of the optimized similarity matrix; and
   when the loss function $L_h$ is required to update the similarity matrix in the process of optimization, then using a loss function $L_{hs}$.

2. The method as claimed in claim 1, wherein the convolutional neural network is an improved convolutional neural network CNN-F (Convolutional Neural Networks and the Improved Fisher Vector Network);
   wherein, the improved convolutional neural network CNN-F, a network structure thereof comprises:
   sequentially connected a first convolutional layer, a second convolutional layer, a third convolutional layer, a fourth convolutional layer, a fifth convolutional layer, a first fully connected layer, a second fully connected layer, a third fully connected layer and a Tanh function layer; an output dimension of the third fully connected layer is set to K dimensions.

3. The method as claimed in claim 1, wherein the trained convolutional neural network, a training step thereof comprises:
   constructing a training set and a test set; the training set and the test set, both comprising: images with known labels;
   inputting the images with known labels of the training set into the convolutional neural network for training, and then outputting hash codes of the images with known labels by the convolutional neural network; constructing a loss function based on the hash codes of the images with known labels and the known labels; stopping the training when the loss function reaches a minimum value; and
   inputting the test set into the convolutional neural network for testing, stopping the testing when an accuracy exceeds the set threshold, and identifying the current convolutional neural network as the trained convolutional neural network.

4. The method as claimed in claim 1, wherein the trained convolutional neural network is obtained by using the different loss functions for training based on different situations.

5. The method as claimed in claim 1, wherein the unified loss function $L_u$ based on the similarity of the hash codes, a formula thereof is expressed as:

$$L_u = \frac{1}{n}\sum_1^n \log\left[1 + \frac{1}{|X_i^+||X_i^-|}\sum_{x_k \in X_i^-} \exp(\gamma(\varphi_{ik} + m)) \sum_{x_j \in X_i^+} \exp(\gamma(-\varphi_{ij}))\right] \quad (1)$$

wherein, |g| denotes the number of samples in the set, $X_i^+$ denotes the set of similar samples of the samples $x_i$, $X_i^-$ denotes the set of dissimilar samples of the samples $x_i$, $\gamma$ is a scaling factor, m is an interval, n is the number of images in the training set, $\varphi_{ik}$ is the prediction sample similarity of the hash codes of the samples $x_i$ and $x_k$, $\varphi_{ij}$ is the prediction sample similarity of the hash codes of the samples $x_i$ and $x_j$, wherein, $x_j$ is the j-th sample, $x_k$ is the k-th sample;
the loss function that weights the interval of the similarity prediction scores of positive and negative samples is expressed as:

$$L_{su} = \frac{1}{n}\sum_1^n \log\left[1 + \frac{1}{|X_i^+||X_i^-|}\sum_{x_k \in X_i^-} \exp(\gamma(\varphi_{ik}))\right] \quad (2)$$

-continued $$\sum_{x_j \in X_i^+} \exp\left(\gamma(-\varphi_{ij} + s_{ij} \cdot m)\right)\right]$$

wherein, $s_{ij}$ is the similarity of the sample $x_i$ and $x_j$.

6. The method as claimed in claim 1, wherein the loss function $L_c$ based on the similarity of the hash codes is expressed as:

$$L_c = \frac{1}{n}\sum_{1}^{n} \log\left[1 + \frac{1}{|X_i^+||X_i^-|}\sum_{x_k \in X_i^-} \exp\left(\gamma(\varphi_{ik} + 1)^2\right) \sum_{x_j \in X_i^+} \exp\left(\gamma(\varphi_{ij} - 1)^2 - m\right)\right] \quad (3)$$

wherein, $L_c$ is a circular loss function based on the similarity of the hash codes;

the loss function $L_{sc}$ that weights the interval of the similarity prediction scores of positive and negative samples is expressed as:

$$L_{sc} = \frac{1}{n}\sum_{1}^{n} \log\left[1 + \frac{1}{|X_i^+||X_i^-|}\sum_{x_k \in X_i^-} \exp\left(\gamma(\varphi_{ik} + 1)^2\right) \sum_{x_j \in X_i^+} \exp\left(\gamma(\varphi_{ij} - 1)^2 - (s_{ij} - 1) \cdot m\right)\right] \quad (4)$$

wherein, $L_{sc}$ denotes the round loss function that weights the interval of the similarity prediction scores of positive and negative samples.

7. The method as claimed in claim 1, wherein the loss function $L_h$ is expressed as:

$$L_h = \frac{1}{n}\sum_{1}^{n} \log\left[1 + \frac{1}{|X_i^+||X_i^-|}\sum_{x_k \in X_i^-} \exp\left(\gamma(\max(0, \varphi_{ik} + t))^2\right) \sum_{x_j \in X_i^+} \exp\left(\gamma(\max(0, \varphi_{ij} - s_{ij}^{\alpha}))^2 - m\right)\right] \quad (5)$$

wherein, $L_h$ denotes the circular loss function that combines the characteristics of the hash retrieval task, t is a hyper-parameter that regulates the highest similarity score for negative samples, and $\alpha$ is a hyper-parameter that regulates the lowest similarity score for positive samples.

8. The method as claimed in claim 1, wherein the unified loss function $L_{sus}$, weighted based on the interval of the optimized similarity matrix is expressed as:

$$L_{sus} = \frac{1}{n}\sum_{1}^{n} \log\left[1 + \frac{1}{|X_i^+||X_i^-|}\sum_{x_k \in X_i^-} \exp\left(\gamma(\varphi_{ik})\right) \sum_{x_j \in X_i^+} \exp\left(\gamma(-\varphi_{ij} + s_{ij}' \cdot m)\right)\right]; \quad (6)$$

the circular loss function $L_{scs}$ weighted based on the interval of the optimized similarity matrix is expressed as:

$$L_{scs} = \frac{1}{n}\sum_{1}^{n} \log\left[1 + \frac{1}{|X_i^+||X_i^-|}\sum_{x_k \in X_i^-} \exp\left(\gamma(\varphi_{ik} + 1)^2\right) \sum_{x_j \in X_i^+} \exp\left(\gamma(\varphi_{ij} - 1)^2 - (s_{ij}' - 1) \cdot m\right)\right]; \quad (7)$$

the circular loss function $L_{hs}$ based on the similarity matrix combined with the characteristics of the hash retrieval task is expressed as:

$$L_{ns} = \frac{1}{n}\sum_{1}^{n} \log\left[1 + \frac{1}{|X_i^+||X_i^-|}\sum_{x_k \in X_i^-} \exp\left(\gamma(\max(0, \varphi_{ik} + t))^2\right) \sum_{x_j \in X_i^+} \exp\left(\gamma(\max(0, \varphi_{ij} - s_{ij}^{\alpha'}))^2 - m\right)\right]. \quad (8)$$

9. A system for rapid retrieval of target images based on artificial intelligence adopted by a method of claim 1, comprising:
an acquisition module, configured to: obtaining a template image and a plurality of known labels corresponding to the template image;
an extraction module, configured to: extracting an image to be detected from a target image database;
a conversion module, configured to: inputting both the image to be detected and the template image into a trained convolutional neural network, then outputting a hash code of the image to be detected and a hash code of the template image; and
an output module, configured to: obtaining a similarity between the image to be detected and the template image based on a Hamming distance between the hash code of the image to be detected and the hash code of the template image, and the smaller of the Hamming distance indicates the higher of the similarity, and then selecting one or more images to be detected with the similarity higher than a set threshold as a retrieval result to output.

* * * * *